US006732627B2

(12) United States Patent
Wattenbach et al.

(10) Patent No.: US 6,732,627 B2
(45) Date of Patent: May 11, 2004

(54) CARRYING MECHANISM FOR POWER TOOLS

(75) Inventors: Brian P. Wattenbach, Columbia, MD (US); Richard J. Jemison, Richmond (GB)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/226,010

(22) Filed: Aug. 22, 2002

(65) Prior Publication Data

US 2004/0035596 A1 Feb. 26, 2004

(51) Int. Cl.[7] .......................... B23B 45/14; B23E 51/00
(52) U.S. Cl. ...................... 83/701; 173/162.2; 173/171; 294/158
(58) Field of Search ................................. 173/152, 171, 173/170, 162.2; 294/158, 165, 170; 30/296.1, 298.4, 248.37, 514, 517; 224/904, 150; 83/701, 109, 743, 744, 745, 859, 471.3 473, 490, 581

(56) References Cited

U.S. PATENT DOCUMENTS

| | | | |
|---|---|---|---|
| 3,115,910 A | | 12/1963 | Steiner |
| 3,790,049 A | * | 2/1974 | Bohanec ...................... 294/139 |
| 3,823,474 A | * | 7/1974 | Ionescu ........................ 30/383 |
| 4,413,412 A | | 11/1983 | Wetzel |
| 4,659,129 A | * | 4/1987 | Schuetzeberg et al. ..... 294/147 |
| 4,748,712 A | * | 6/1988 | DiGiovanni ............... 15/327.5 |
| 4,785,540 A | * | 11/1988 | Arvidsson ..................... 30/520 |
| 5,042,348 A | * | 8/1991 | Brundage et al. .......... 83/471.3 |
| 5,353,465 A | * | 10/1994 | Pierce et al. ............. 15/236.01 |
| 5,615,746 A | * | 4/1997 | Chu ........................... 173/171 |
| 5,692,306 A | * | 12/1997 | Stoll et al. ..................... 30/276 |
| 6,070,676 A | * | 6/2000 | Nelson et al. .............. 173/170 |
| 6,230,367 B1 | * | 5/2001 | Riedl .......................... 16/436 |
| 6,446,734 B1 | * | 9/2002 | Williams et al. ............... 173/1 |

FOREIGN PATENT DOCUMENTS

| | | |
|---|---|---|
| DE | 100 42 178 C | 12/2001 |
| DE | 101 02 290 A | 7/2002 |
| FR | 2 589 339 A | 5/1987 |

OTHER PUBLICATIONS

Sakai et al., Electric Power Tool, US 2003/0159843.*
Kawamoto et al., Multiple–Position, Operator–Carried, Four–Stroke Engine, US 2002/0121262.*
U. Matzdorf, European Search Report on Application No. EP 03 01 8542, Nov. 24, 2003, The Hague.
Annex to the European Search Report on European Patent Application No. EP 03 01 8542.

* cited by examiner

Primary Examiner—Rinaldi I. Rada
Assistant Examiner—Gloria R Weeks
(74) Attorney, Agent, or Firm—Adan Ayala

(57) ABSTRACT

A power tool including a motor, a housing having first and second holes, and first and second plugs disposed within the first and second holes, respectively, the first and second plugs each connectable to a belt. One of the first plug and the belt has a hole and the other of the first plug and the belt has a hook insertable into the hole.

19 Claims, 2 Drawing Sheets

CARRYING MECHANISM FOR POWER TOOLS

FIELD OF THE INVENTION

This invention relates generally to in general to power tools, and, in particular to a power tool with a carrying mechanism.

BACKGROUND OF THE INVENTION

Typically, power tools are carried by a carrying handle. Sometimes, the power tools may weigh too much for carrying it comfortably by the carrying handle. Accordingly, it is an object of the invention to provide an improved carrying mechanism.

SUMMARY OF THE INVENTION

In accordance with the present invention, an improved power tool is employed. The power tool includes a motor, a housing having first and second holes, first and second plugs disposed within the first and second holes, respectively, the first and second plugs each connectable to a belt. One of the first plug and the belt has a hole and the other of the first plug and the belt has a hook insertable into the hole.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 4 is a partial cross-sectional view along line IV—IV of FIG. 3, where

DETAILED DESCRIPTION

The invention is now described with reference to the accompanying figures, wherein like numerals designate like parts. Persons skilled in the art shall recognize that while a miter saw has been used to illustrate the invention, the invention can be used in other power tools.

Figure 1:
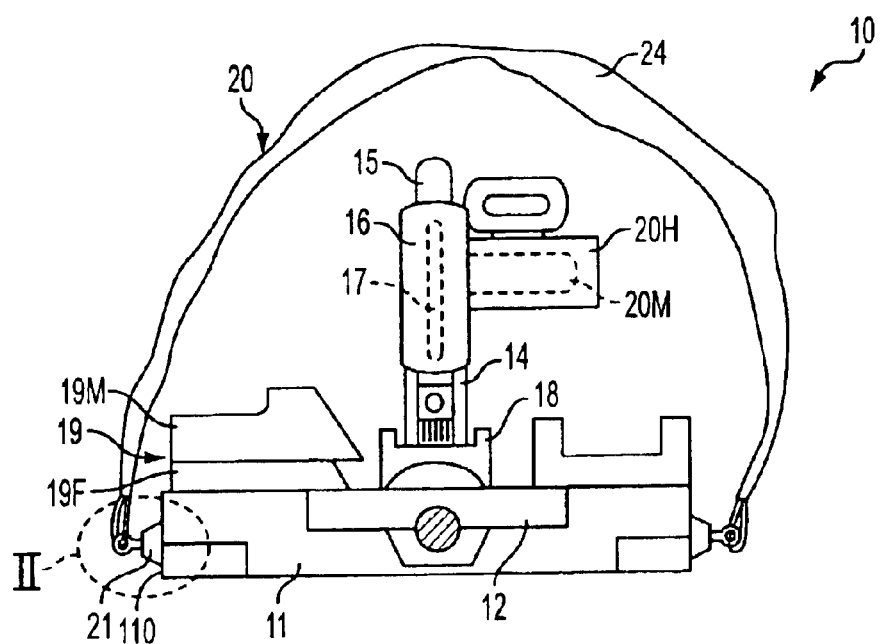
FIG. 1 is a front view of a miter saw having a first embodiment of a carrying mechanism constructed with the principles of the invention.
Figure 2:
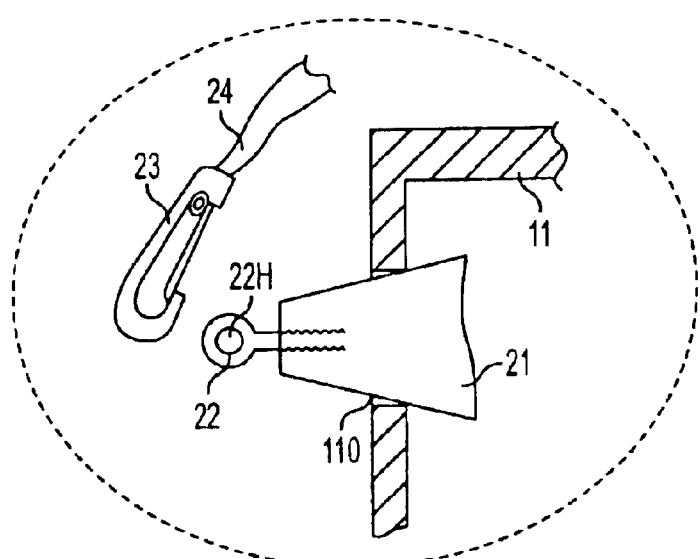
FIG. 2 is a partial cross-section of the portion circled by line II in FIG. 1.

Miter saws designed for cutting a workpiece are well known in the art. Referring to FIGS. 1–2, a miter saw 10 typically has a base 11, which may include a rotatable table 12 rotatably attached to base 11. A pivot arm 14 is pivotally attached to a trunnion 18 to allow a chopping function. The trunnion 18 in turn may be pivotally attached to the base 11 and/or table 12, to allow the trunnion 18 and pivot arm 14 to pivot relative to the base 11.

The pivot arm 14 carries a saw assembly which includes motor housing 20H, a motor 20M disposed in motor housing 20H, a blade 17 driven by motor 20M, an upper blade guard 15 covering an upper part of the blade 17, and a lower blade guard 16 pivotally attached to upper blade guard 15 for covering a lower part of the blade 17.

A fence assembly 19 may be provided on both sides of blade 17. Persons skilled in the art are referred to the fence assemblies disclosed in U.S. Pat. Nos. 5,297,463 and 5,733,148, which are wholly incorporated herein by reference. Fence assembly 19 has a fixed fence 19F disposed on base 11, and a movable fence 19M slidably disposed on fixed fence 19F.

Miter saw 10 may be provided with carrying mechanism 20. Base 11 may have openings 11O. Persons skilled in the art will recognize that, while openings 11O have been disposed on base 11, such openings may be disposed in any other part of miter saw 10.

Plugs 21 may be inserted through openings 11O. Plugs 21 are preferably made of plastic, such as nylon, rubber, etc.

Plugs 21 are preferably shaped as a truncated cone. However, persons skilled in the art will recognize that plugs 21 can be shaped into any shape necessary to engage openings 11O.

An eyelet 22 defining a hole 22H may be screwed unto plug 21. Nevertheless, persons skilled in the art should recognize that eyelet 22 can be attached to plug 21 in other ways as well. In addition, hole 22H could be formed unto plug 21 itself.

A belt 24 can be attached to eyelets 22 via hooks 23 disposed at each end of belt 24. Preferably, belt 24 is made of nylon. Hooks 23 are preferably self-closing hooks.

With such construction, the user can push plugs 21 through openings 11O, screw on the eyelets 22, attach belt 24 to eyelets 22, and carry the miter saw 10. Preferably, openings 11O will be disposed on both left and right sides of base 11. However, persons skilled in the art should recognize that openings 11O may be disposed on the same side of base 11. Furthermore, persons skilled in the art should recognize that belt 24 may be attached to only one eyelet 22.

Figure 3:
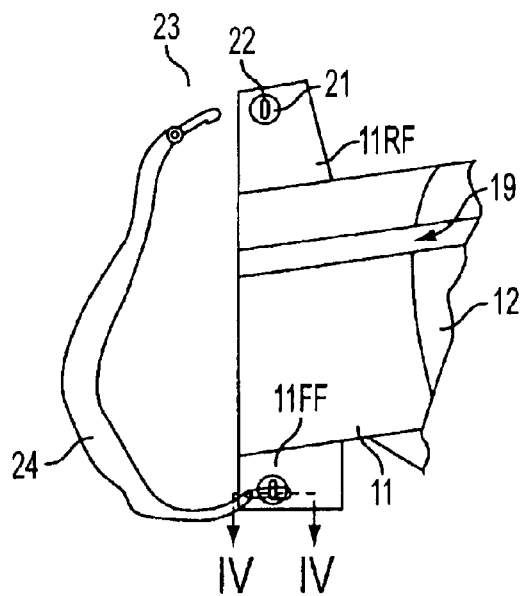
FIG. 3 is a partial top plan view of a second embodiment of the carrying mechanism according to the invention.

FIGS. 3–4 disclose an alternate embodiment of carrying mechanism 20, where like numerals refer to like parts. Persons skilled in the art should recognize that all the lessons taught by the previous embodiment are incorporated into the present embodiment by reference.

The main difference between the present and previous embodiments is that, instead of attaching plugs 21 to a side wall of base 11, plugs 21 are attached to feet portions of base 11. In particular, miter saw 10 has at least one front foot 11FF and at least one rear foot 11RF. Each foot preferably has at least one opening 11OF defined by a wall 11FW.

Plugs 21 may be inserted through openings 11OF. Plugs 21 are preferably made of plastic, such as nylon, rubber, etc. Plugs 21 are preferably shaped as a truncated cone. Alternatively, plugs 21 are substantially cylindrical. However, persons skilled in the art will recognize that plugs 21 can be shaped into any shape necessary to engage openings 11FO.

Figure 4A:
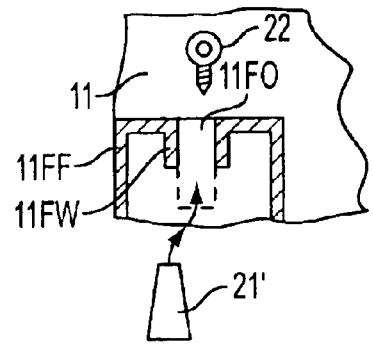
FIGS. 4A–4B show two alternate arrangements, respectively.
Figure 4B:
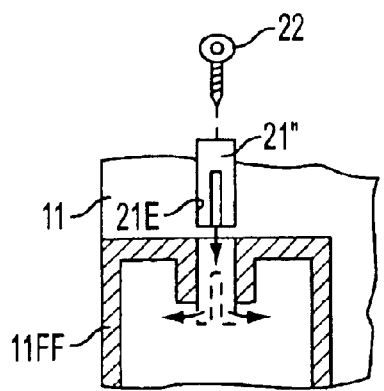

Referring to FIG. 4A, the user can push plugs 21' through openings 11FO from the underside of base 11, screw on the eyelets 22, attach belt 24 to eyelets 22, and carry the miter saw 10. Alternatively, referring to FIG. 4B, the user can push plugs 21" through openings 11FO from the top of base 11, screw on the eyelets 22, attach belt 24 to eyelets 22, and carry the miter saw 10. Plug 21" may have split ends 21E which expand as eyelet 22 is screwed thereon to maintain plug 21" within opening 11FO.

As mentioned above, openings 11FO are preferably disposed on both front and rear feet 11FF, 11RF of base 11. However, persons skilled in the art should recognize that openings 11FO may be disposed on the same foot. Furthermore, persons skilled in the art should recognize that belt 24 may be attached to only one eyelet 22.

Persons skilled in the art may recognize other additions or alternatives to the means disclosed herein. However, all these additions and/or alterations are considered to be equivalents of the present invention.

What is claimed is:

1. A power tool comprising:
   a base having a first opening, the first opening extending through opposite first and second sides of the base;
   a saw assembly pivotally attached to the base, the saw assembly including a motor, and a blade driven by the motor, wherein the blade is movable between a first position away from the base and a second position towards the base for cutting a workpiece disposed on the base;
   a first plug disposed within the first opening, the first plug inserted through the first opening from the first side of the base so that a first portion of the first plug is adjacent the second side of the base; and
   a belt attached to the first portion of the first plug.

2. The power tool of claim 1, wherein one of the first plug and the belt has a first hole and the other of the first plug and the belt has a first hook attachable to the first hole.

3. The power tool of claim 2, wherein the first hook is a self-closing hook.

4. The power tool of claim 2, wherein the first hole is disposed in an eyelet of the first plug, and the belt is connected to the first hook.

5. The power tool of claim 1, wherein the base has a second opening, the power tool further comprising a second plug disposed within the second opening, wherein the belt is attached to the second plug.

6. The power tool of claim 5, wherein one of the second plug and the belt has a second hole and the other of the second plug and the belt has a second hook attachable to the second hole.

7. The power tool of claim 6, wherein the second hook is a self-closing hook.

8. The power tool of claim 6, wherein the second hole is disposed in an eyelet of the second plug, and the belt is connected to the second hook.

9. The power tool of claim 5, wherein the second plug is a truncated cone.

10. The power tool of claim 5, wherein the second plug is substantially cylindrical.

11. The power tool of claim 5, wherein the second plug is made of plastic.

12. The power tool of claim 5, wherein the base has front and rear feet.

13. The power tool of claim 12, wherein the first and second plugs are disposed within the front and rear feet, respectively.

14. The power tool of claim 5, wherein the base has left and right sides.

15. The power tool of claim 14, wherein the first and second plugs are disposed within the left and right sides, respectively.

16. The power tool of claim 1, wherein the first plug is a truncated cone.

17. The power tool of claim 1, wherein the first plug is substantially cylindrical.

18. The power tool of claim 1, wherein the first plug is made of plastic.

19. The power tool of claim 1, wherein the power tool is a miter saw.

* * * * *